United States Patent [19]

Nakashima et al.

[11] Patent Number: 5,112,547
[45] Date of Patent: May 12, 1992

[54] METHOD OF MAKING AN ELONGATE ARTICLE

[75] Inventors: Tukasa Nakashima; Tetsuo Hotta; Tatsuya Tamura, all of Yokohama, Japan

[73] Assignee: Hashimoto Forming Industry Co., Ltd., Japan

[21] Appl. No.: 390,413

[22] Filed: Aug. 7, 1989

[51] Int. Cl.$^5$ .................. B29C 47/04; B29C 47/06; B32B 31/30

[52] U.S. Cl. .................. 264/167; 264/139; 264/171; 264/177.1; 264/177.2; 264/245

[58] Field of Search .......... 264/139, 167, 171, 177.1, 264/177.16, 177.2, 245, 246, 73, 75

[56] References Cited

U.S. PATENT DOCUMENTS

| | | | |
|---|---|---|---|
| 3,769,380 | 10/1973 | Wiley | 264/171 X |
| 4,248,824 | 2/1981 | Hattop | 264/171 |
| 4,358,334 | 11/1982 | Sutrina et al. | 156/497 |
| 4,531,326 | 6/1985 | Ballocca | 49/497 |
| 4,765,936 | 8/1988 | Ballocca | 264/46.1 |
| 4,826,423 | 5/1989 | Kemp et al. | 425/505 |
| 4,865,796 | 9/1989 | Tamura et al. | 264/167 X |

FOREIGN PATENT DOCUMENTS

| | | |
|---|---|---|
| 0081093 | 6/1983 | European Pat. Off. |
| 0158919 | 10/1985 | European Pat. Off. |
| 0270337 | 6/1988 | European Pat. Off. |
| 0294337 | 12/1988 | European Pat. Off. |
| 2921943 | 12/1980 | Fed. Rep. of Germany |
| 54-93055 | 7/1979 | Japan |
| 57-185133 | 11/1982 | Japan |
| 58-116140 | 7/1983 | Japan ............ 264/139 |
| 58-205746 | 11/1983 | Japan |
| 59-59426 | 4/1984 | Japan |
| 60-99633 | 6/1985 | Japan ............ 264/177.1 |
| 60-116423 | 6/1985 | Japan |
| 61-135824 | 6/1986 | Japan |
| WO84/01741 | 5/1984 | PCT Int'l Appl. |
| 1076326 | 7/1967 | United Kingdom |
| 1444326 | 7/1976 | United Kingdom |

*Primary Examiner*—Leo B. Tentoni
*Attorney, Agent, or Firm*—Stevens, Davis, Miller & Mosher

[57] ABSTRACT

Method of for continuously manufacturing a plurality of kinds of elongate articles with basically same and slightly different cross-sections, such as upper and side segments of automobile molding members. The method employs a single die plate formed with a common orifice and at least one additional orifice, as well as a device for selecting and controlling operational modes of the apparatus. The device may comprise a movable guide member which is movable between different positions corresponding to respective operational modes of the apparatus, and serves to guide synthetic resin material extruded from the additional orifice. The guide member maintains in its one position a spaced relationship of synthetic resin materials extruded from the orifices to form one kind of elongate articles, and causes in another position the synthetic resin materials to adhere with each other to form another kind of elongate articles.

8 Claims, 15 Drawing Sheets

FIG_5

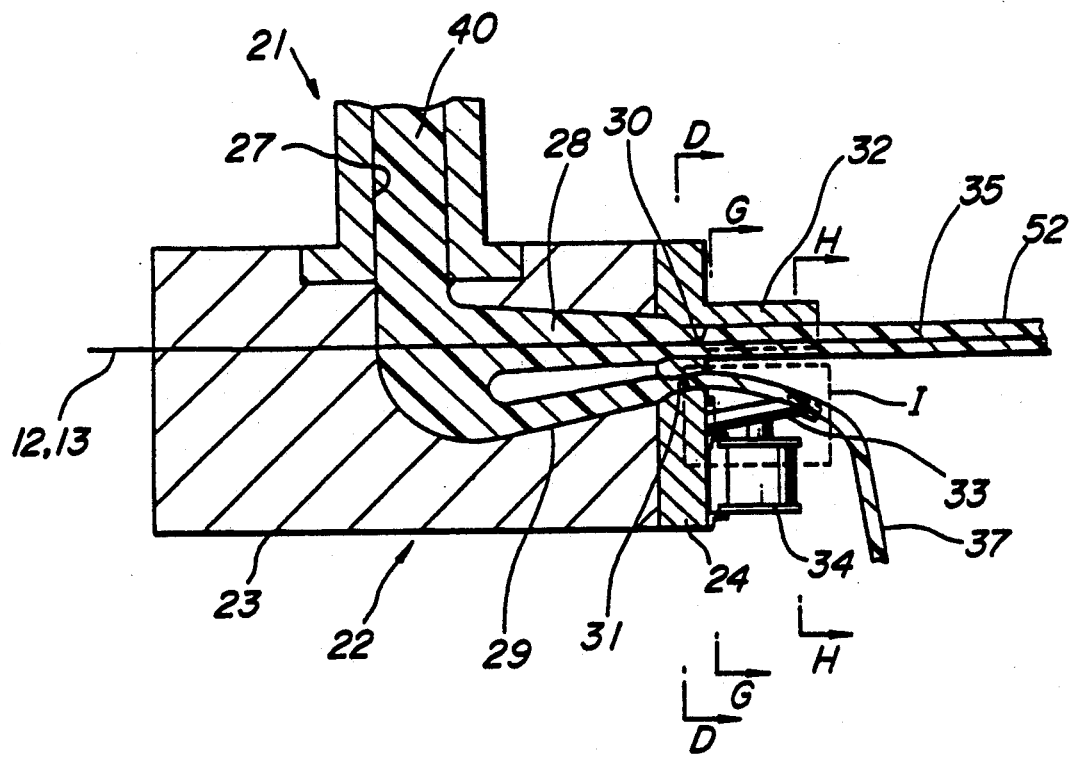
FIG_7
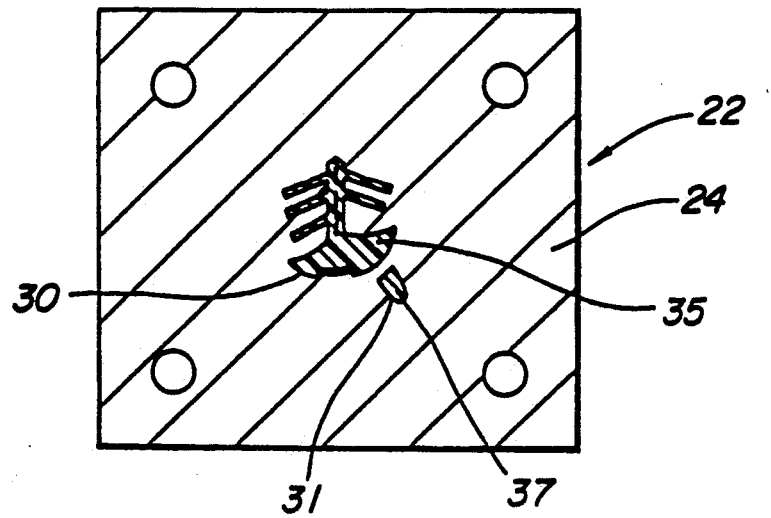
FIG_8

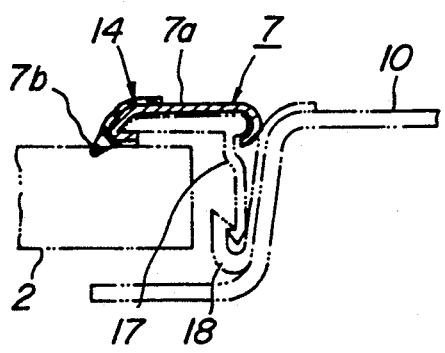
FIG._14
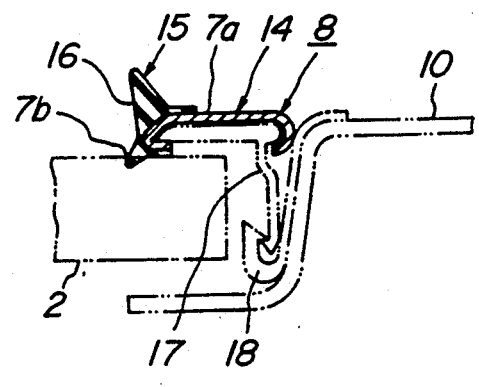
FIG._15
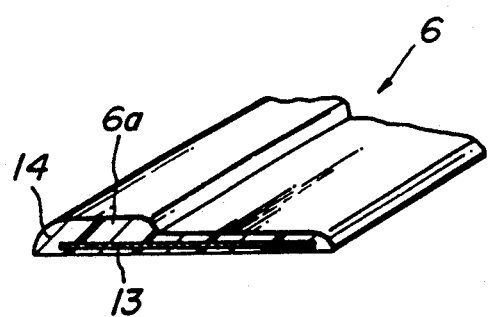
FIG._16
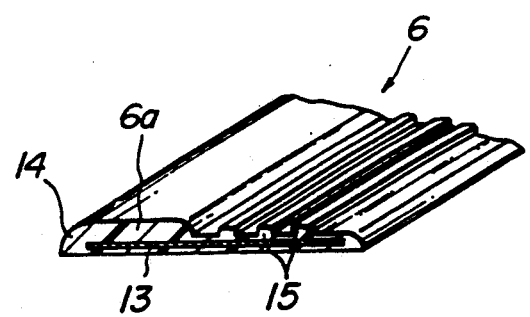
FIG._17

METHOD OF MAKING AN ELONGATE ARTICLE

BACKGROUND OF THE INVENTION

1. Field of the Invention

The present invention relates to a method of, and an apparatus for manufacturing a plurality of kinds of elongate articles, e.g. molding members for automobiles and the like, or segments of such molding members.

2. Description of the Related Art

A variety of molding members are used widely, such as front or rear window molding members, body side molding members, etc., for automobiles, which are generally composed of extruded synthetic resin material. Among others, Japanese Patent Application Laid-open Publication No. 61-135,824 discloses a windshield molding member which includes an upper segment to extend along an upper edge of a windshield plate, a pair of side segments to extend along side edges of the windshield plate, and a pair of corner segments connecting the upper and side segments into an integral component.

In the known molding members mentioned above, the upper and side segments are composed of synthetic resin material extruded into respectively predetermined cross-sections which are basically the same width, and slightly different from each other. More particularly, the upper segment includes a main body which is provided with a first lip section to be engaged with the other surface of a windshield plate, a second lip section to be engaged with the outer surface of vehicle body panel, and a leg section to be inserted into a gap between the edge of the windshield plate and the body panel. The leg section has fins on both sides to be engaged with the periphery of the windshield plate and the body panel, respectively, so as to prevent undesirable withdrawal of the lip section out of the gap. The upper segment may have an ornamental film and a core element arranged in the main body and the leg section, respectively, depending upon ornamental and/or functional requirements. On the other hand, the side segment has a basic cross-section which is the same as that of the upper segment, as well as an additional section in the form of a ridge on the first lip section, which is adapted to define a weir or channel extending along a side edge of the windshield plate. The upper segment without ridge serves to realize a flush surface of the automobile body along the upper edge of the windshield plate, while the ridge on the side segment achieves the functions to guide rain water on the windshield plate to flow along the weir or channel, and to thereby prevent the rain water from flowing onto a side window across the side segment and neighboring body panel portion (or pillar) to disturb the driver's sight which is through the side windows.

In order to manufacture the upper and side segments of mutually different cross-section, it has been a conventional practice to prepare and selectively use two extrusion die plates, one for the upper segments and the other for the side segments, which are expensive and make it thus difficult to reduce the production cost of the molding members. Not only the exchange of the die plates requires troublesome and time-consuming manual operations, but also it is necessary to carry out a test-running extrusion after each exchange of the die plate, in order to confirm that the synthetic resin material can be stably extruded into a continuous body with a desired accuracy of the cross-section. Moreover, the synthetic resin material as well as the ornamental film and the core element, which have been extruded from the die plate during the test-running extrusion period, have to be disposed of as industrial waste materials. Alternate use of different die plates to produce different elongate articles of basically the same cross-section proved to be disadvantageous in many cases, particularly when a relatively small number of elongate articles of various cross-sections are to be produced in each production lot.

SUMMARY OF THE INVENTION

It is therefore an object of the present invention to provide novel method and apparatus whereby different elongate articles of basically the same cross-section can be readily and reliably manufactured in a continuous manner and with a higher productivity.

According to one aspect of the present invention, there is provided a method of manufacturing a plurality of kinds of elongate articles having a common cross-sectional portion which is for all the kinds of the elongate articles to be manufactured, at least one kind of said elongate articles further having at least one additional cross-sectional portion, said method comprising the steps of: using a single extrusion die head including a die plate formed with a common orifice of a cross-sectional contour corresponding to that of said common cross-sectional portion of an elongate article, and also with at least one additional orifice of a cross-sectional contour corresponding to that of said additional cross-sectional portion of said at least one kind of elongate articles, said orifices being arranged close to each other; extruding from said common orifice of said die plate synthetic resin material to form a first continuous body corresponding to first elongate articles; and extruding from said common orifice and at least one of said additional orifice of said die plate synthetic resin materials, and causing the extruded synthetic resin materials to adhere with each other while they are still hot and in molten states, to form a second continuous body corresponding to second elongate articles.

According to another aspect of the present invention, there is provided an apparatus for manufacturing a plurality of kinds of elongate articles having a common cross-sectional portion which is for all the kinds of the elongate articles to be manufactured, at least one kind of said elongate articles further having at least one additional cross-sectional portion, said apparatus comprising: an extrusion die head including a die plate formed with a common orifice having a cross-sectional contour corresponding to that of said common cross-sectional portion of an elongate article, and also with at least one additional orifice having a cross-sectional contour corresponding to that of said additional cross-sectional portion of said at least one kind of elongate article, said orifices being arranged close to each other; and means for selecting and controlling first and second operational modes of the apparatus such that, in said first operational mode of the apparatus, synthetic resin material is extruded from said common orifice of said die plate to form a first continuous body corresponding to first elongate articles and, in said second operational mode of the apparatus, synthetic resin materials are extruded from said common orifice and at least one additional orifice of said die plate and caused to adhere with each other while they are still hot and in molten states, to form a second continuous body corresponding to second elongate articles.

The present invention makes use of a single extrusion die head including a die plate formed with a common orifice and at least one additional orifice which are arranged close to each other. A first continuous body corresponding e.g. to the upper segments of a windshield molding member ca be manufactured either by extruding molten synthetic resin material from the common orifice alone, or by extruding resin materials from both the common orifice and the additional orifice while preventing adhesion of the resin material from the common orifice with the resin material from the common orifice. In the latter case, the resin material from the additional orifice can be recovered and used again. On the other hand, a second continuous body corresponding e.g. to the side segments of the molding member can be manufactured by extruding resin materials from both the common orifice and the additional orifice and causing the extruded materials to adhere with each other while they are still hot and in molten states.

According to the present invention, it is possible to manufacture a plurality of kinds of elongate articles with basically same and slightly different cross-sections, by using a single extrusion die plate with a common orifice and at least one additional orifice. The present invention thus allows a plurality of kinds of elongate articles to be manufactured continuously and economically, without requiring exchange of the die plates as well as a test-running extrusion after each exchange of the die plate.

A molding process for manufacturing elongate articles, including extrusion of a molten synthetic resin material from a plurality of orifices closely arranged in a single die plate, and subsequent adhesion of the extruded materials with each other, per se, is known e.g. from Japanese patent Application Laid-open Publication Nos. 54-93,055; 57-185,133; 58-205,746; 59-59,426 and 60-116,423. However, this known process is for the manufacture of elongate articles with a single kind of cross-section only; in order to manufacture molding members or segments with mutually different cross-sections, it would be necessary to prepare a plurality of exchangeable die plates.

BRIEF DESCRIPTION OF THE DRAWINGS

FIG. 7 is a longitudinal sectional view of the extrusion die head, with the movable guide member assuming an inoperative position maintaining the extruded continuous bodies spaced from each other;

FIG. 8 is a cross-sectional view of the die plate taken along the line D—D in FIGS. 6 and 7;

FIG. 14 is a cross-sectional view of another example of the upper segment of a windshield molding member;

FIG. 15 is a cross-sectional view of the side segment which corresponds to the upper segment of FIG. 14;

FIGS. 16 and 17 are cross-sectional views of side molding members which are of basically same and slightly different cross-section;

DETAILED DESCRIPTION OF THE PREFERRED EMBODIMENTS

The present invention will be more fully explained hereinafter, by referring to some preferred embodiments shown in the attached drawings.

Figure 1:
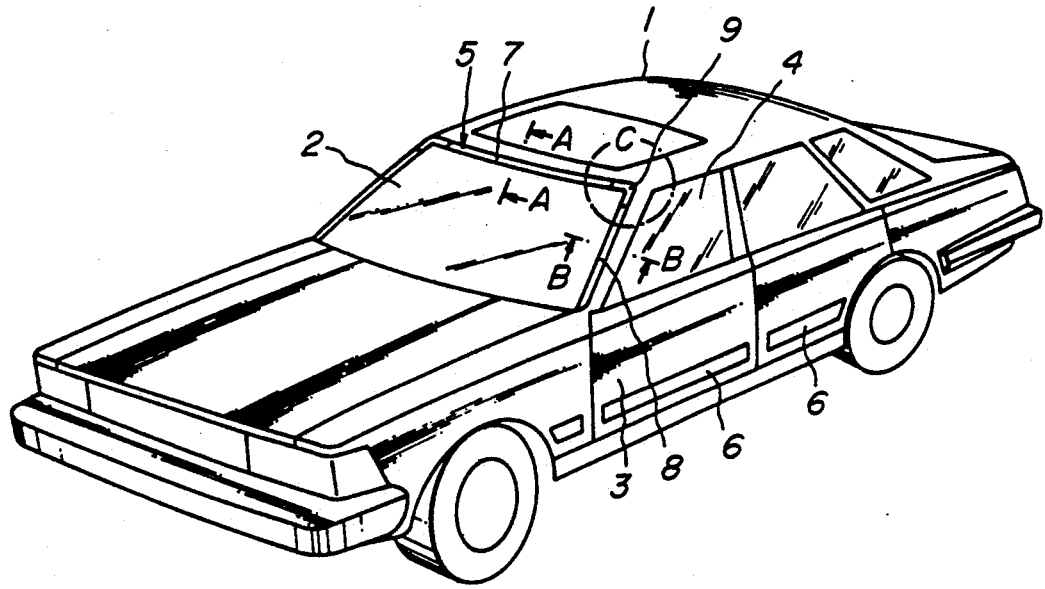
FIG. 1 is a perspective view of an automobile including molding members which may be manufactured by the method according to the present invention.

Referring firstly to FIG. 1, there is shown an automobiles with a body 1, a windshield plate 2, doors 3, side windows 4, as well as a windshield molding member 5 and side molding members 6 which may be manufactured by the method according to the present invention. By way of example, the windshield molding member 5 includes an upper segment 7 to extend along an upper edge of the windshield plate 2, a pair of side segments 8 to extend along the side edges of the windshield plate 2, and a pair of corner segments 9 connecting the upper and side segments 7, 8 into an integral component.

The upper and side segments 7, 8 are composed of appropriate synthetic resin material, such as ABS resin, acrylonitrile resin, polyvinylchloride resin, methylmethacrylate resin, ionomer resin, etc., extruded into respectively predetermined cross-sections which are basically same and slightly different from each other.

Figure 2:
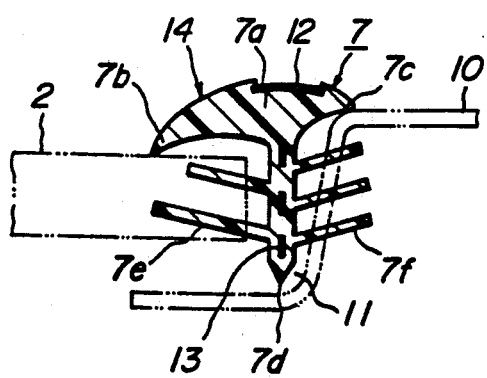
FIG. 2 is a cross-sectional view taken along the line A—A in FIG. 1, showing the upper segment of a windshield molding member.

More particularly, as shown in FIG. 2, the upper segment 7 includes a main body 7a which is provided with a first lip section 7b to be engaged with the outer surface of a windshield plate 2, a second lip section 7c to be engaged with the outer surface of the vehicle body panel 10, and a leg section 7d to be inserted into a gap 11 between the edge of the windshield plate 2 and the body panel 10. The leg section has fins 7e, 7f on its both sides to be engaged with the periphery of the windshield plate 2 and the body panel 10, respectively, so as to prevent undesirable withdrawal of the leg section 7d out of the gap 11. The upper segment 7 has an ornamental film 12 and a core element 13 arranged in the main body 7a and the leg section 7d, respectively. The cross-section of the upper segment 7 is common to the side segments 8, and will thus be referred to as "common cross-section".

Figure 3:
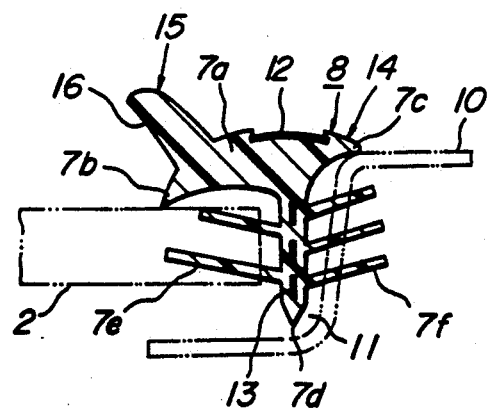
FIG. 3 is a cross-sectional view taken along the line B—B in FIG. 1, showing the side segment of the molding member.

That is, as shown in FIG. 3, the side segment 8 has a basic cross-sectional portion 14 with the above-mentioned common cross-section of the upper segment 7, as well as an "additional cross-sectional portion" in the form of a ridge 15 on the first lip section 7b. The ridge 15 defines a channel or weir 16 extending along a side edge of the windshield plate 2, whereby rain water on the windshield plate 2 can be guided along the ridge 15 and prevented from flowing onto the side windows 4 across the side segment 8 and the neighboring pillar of the vehicle body 1 to disturb the driver's sight through the side windows 4.

Figure 4:
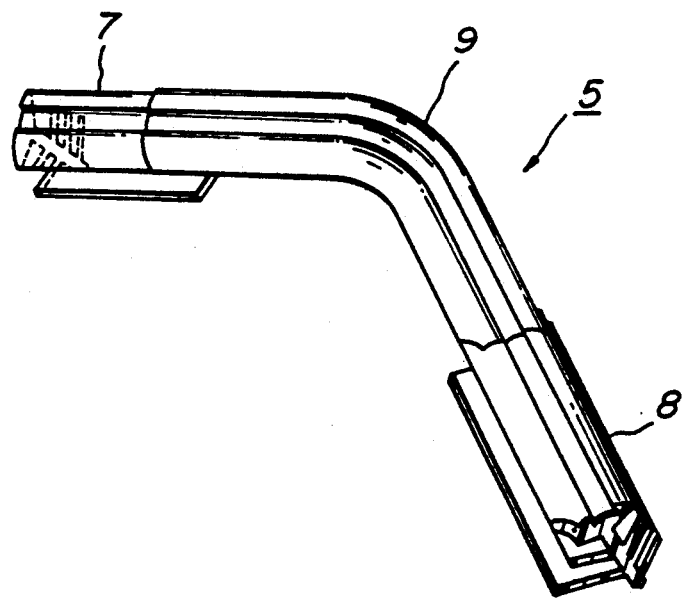
FIG. 4 is a perspective view of the corner segment arranged in the region C in FIG. 1.

The corner segment 9 for connecting the upper and side segments 7, 8 into an integral component is shown in FIG. 4, and may be composed of an appropriate synthetic resin material or metal sheet material. The corner segment 9 has an outer portion with a cross-section which gradually changes from that of the upper segment 7 to that of the side segment 8.

Figure 5:
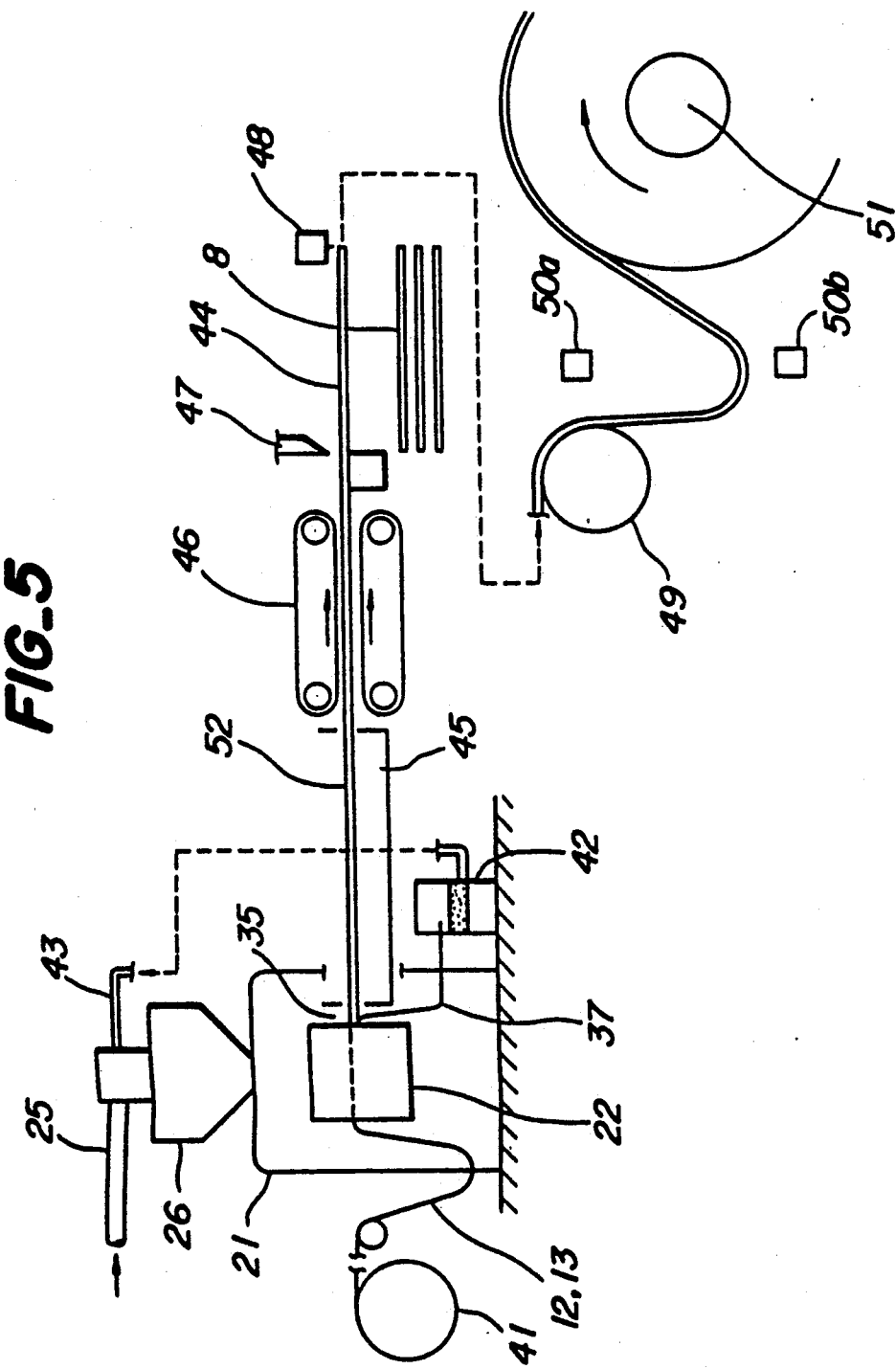
FIG. 5 is a schematic diagram of a production line which can be used to carry out the method according to the present invention for continuously manufacturing the upper and side segments.
Figure 6:
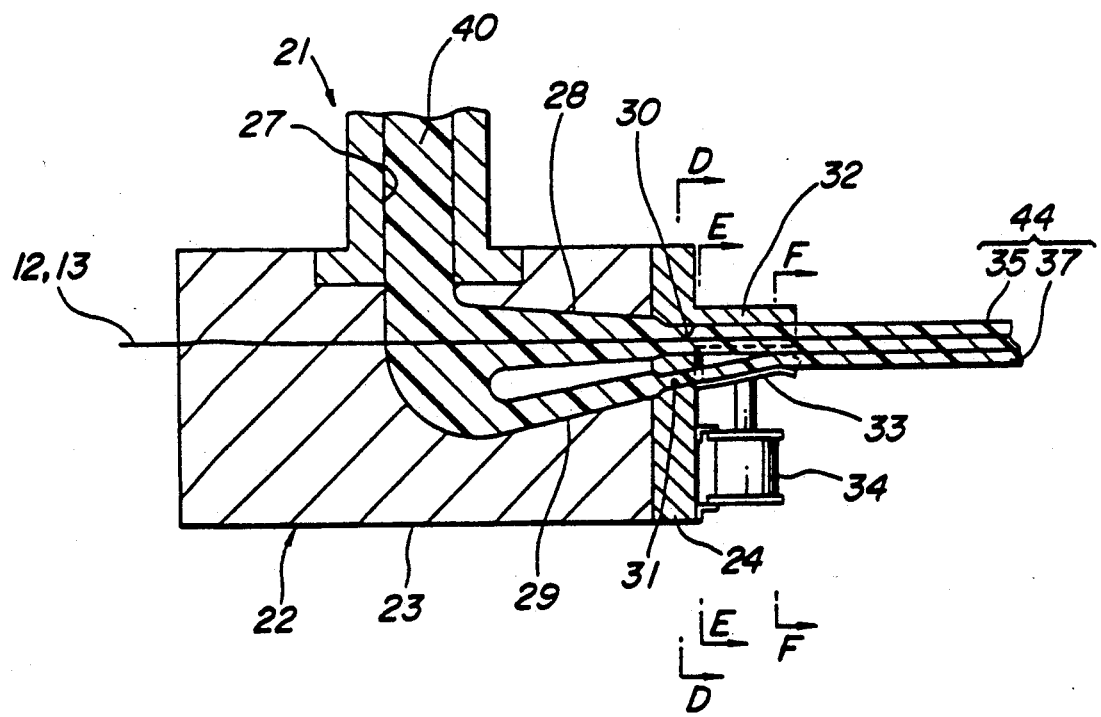
FIG. 6 is a longitudinal sectional view of the extrusion die head, with the movable guide member assuming an operative position causing the extruded continuous bodies to adhere with each other.

FIG. 5 shows the schematic diagram of a production line which can be to carry out the method according to the present invention for continuously manufacturing the upper and side segments 7, 8 mentioned above. The production line includes, as shown in FIGS. 6 and 7, an extruder 21 with an extrusion die head 22 comprising an adapter 23 and a die plate 24 fixedly secured thereto. The extruder 21 is connected with a material supply pipe 25 and a hopper 26 for a synthetic resin material in the form of pellets. The extruder 21 serves to heat the resin material above its softening temperature, which is then fed to the die head 22 in a molten state.

As particularly shown in FIGS. 6 and 7, the extruder 21 has a passage 27 for discharging the resin material, which is connected to a pair of passages 28, 29 formed in the adaptor 23. The die plate 24 has a pair of orifices 30, 31 (FIG. 8) which are connected to the passages 28, 29, respectively, and arranged spaced from, but close to each other. The orifice 30 in the die plate 24 has a cross-sectional contour corresponding to that of the basic, common cross-sectional portion 14 of the upper and side molding segments 7, 8, and will be referred to as "common orifice". The orifice 31, in turn, has a cross-sectional contour corresponding to that of the additional cross-sectional portion or ridge 15 of the side molding segments 8, and will be referred to as "additional orifice".

The die head 22 is provided on the discharge side of the die plate 24 with a stationary guide member 32 and a movable guide member 33 which is arranged opposite to and below the stationary guide member 32. The movable guide member is connected to an actuator, such as a hydraulic or pneumatic cylinder device 34, and can be moved toward and away from the stationary guide member 32. The stationary guide member 32 serves to guide the upper surface of the synthetic resin material 35 which has been extruded from the common orifice 30. The movable guide member 33, in turn, has a groove 36 with a smooth surface which serves to guide the synthetic resin material 37 extruded from the additional orifice 31. The movable guide member 33 as a whole, or at least the region of its groove 36, is composed of a metal material or a hard resin material which does not exhibit the tendency of adhesion with the extruded synthetic resin material 37. The movable guide member 33 on its upper surface is provided with a frame 38 adjacent to the die plate 24, which supports a cutter blade 39 in the form of a metal wire, as particularly shown in FIGS. 9a, 10a and 11.

The remaining constituent elements included in the production line, shown in FIG. 5, will be described below in conjunction with the process steps of the method according to the present invention.

To manufacture the molding member segments 7, 8 shown in FIGS. 2 and 3, the synthetic resin material from the supply pipe 25 and the hopper 26 is heated by the extruder 21 above the softening temperature, and is fed to the die head 22 in a molten state, as shown at 40. The die head 22 is further fed with an ornamental film 12 and cores 13 from respective uncoilers 41, which are passed through predetermined locations of the orifice 30 for the common cross-sectional portion 14 of the segments 7, 8. For the sake of simplicity, the ornamental film 12 and the cores 13 are illustrated in FIG. 5 by a single solid line.

The die plate 24 extrudes the synthetic resin materials 35, 37 for the common cross-sectional portion 14 and the additional cross-sectional portion 15 from the orifices 30, 31 in the die plate 24, respectively. Due to the independently of the orifices 30, 31, the synthetic resin materials 35, 37 as extruded are spaced from each other. The movable guide member 33 is maintained in its retracted position shown in FIG. 7, during the initial test-running period of extrusion, so that the two extruded synthetic resin materials 35, 37 are kept spaced from each other. Thus, the synthetic resin material 37 for the additional cross-sectional portion 15 advances downwardly by the gravity, as soon as it leaves the guide member 33, without being adhered to the synthetic resin material 35 for the common cross-sectional portion 14, and is collected by a collector 42 and returned, as reusable pellets, to the hopper 26 via a return pipe 43.

Figure 9A:
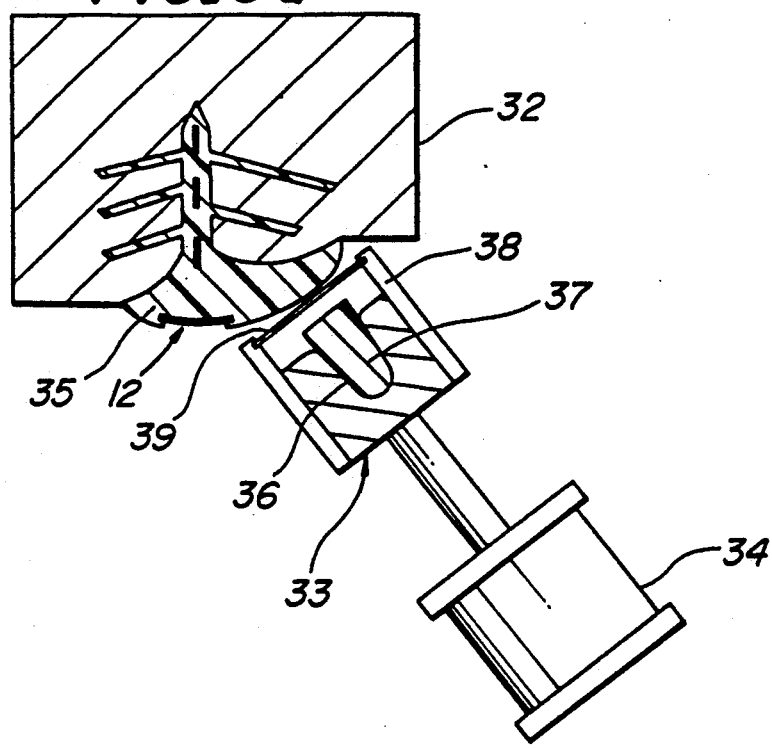
FIGS. 9a and 9b are cross-sectional views taken along the lines E—E and F—F in FIG. 6, respectively.
Figure 9B:
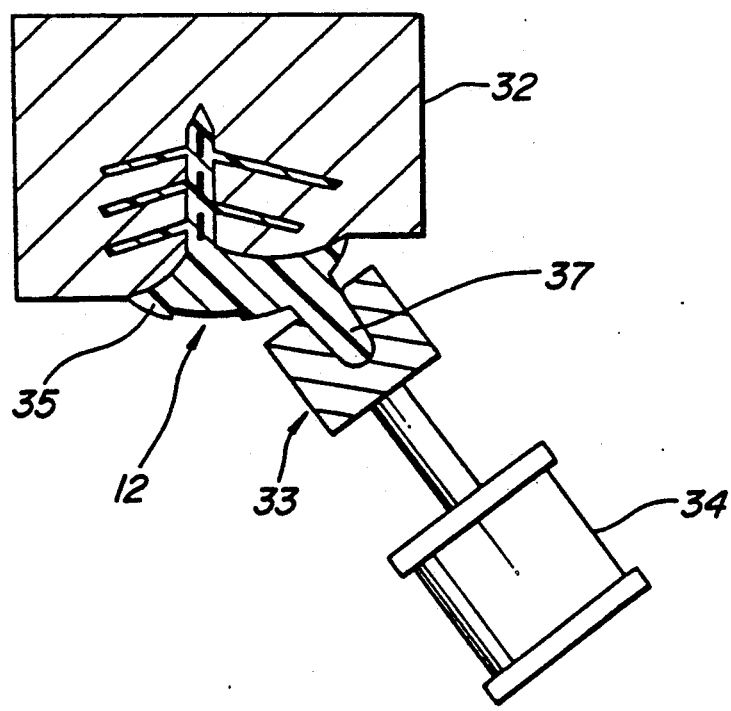

After confirming that the synthetic resin materials 35, 37 can be stably extruded into their respective cross-sections with the desired accuracy, a first step is carried out to initially manufacture the side segments 8 which include both the common cross-sectional portion 14 and the additional cross-sectional portion 15. To this end, as shown in FIG. 6 and FIGS. 9a and 9b, the actuator 34 is put into operation to move the movable guide member 33 toward the stationary guide member 32. On this occasion, the cutter blade 39 supported by the frame 38 on the movable guide member 33 is advanced into and across the synthetic resin materials 37 for the additional cross-sectional portion 15, which has already been extruded from the additional orifice 31, to cut it away. At the same time, a newly extruded synthetic resin material 37 is guided along the groove 36 in the movable guide member 33 and urged against the synthetic resin material 35 for the common cross-sectional portion 14 which, in turn, has been extruded from the common orifice 30 and guided and supported from its upper side by the stationary guide member 32. Thus, the extruded two synthetic resin materials 35 37 are caused to immediately adhere with each other while they are still hot and in molten states, to form a continuous body 44 with a cross-section which corresponds to that of the side segment 8.

The continuous body 44, in which the extruded synthetic resin materials 35, 37 are in adhesion with each other, is subjected to cooling and solidification in a cooling tank 45, hauled by a hauling device 46 and cut by a cutting device 47 into a predetermined length of a molding member side segment 8 while detecting the extruded length of the continuous body 44 by a sensor 48. Alternatively, without actuating the cutting device 47, the continuous body 44 may be passed through an idler roller 49 and position sensors 50a, 50b for detecting the supplied length and/or position of the continuous body 44 and may then be wound onto a drum 51, when it is desired to effect cutting of the continuous body 44 into side segments 8 at a later stage.

Figure 10A:
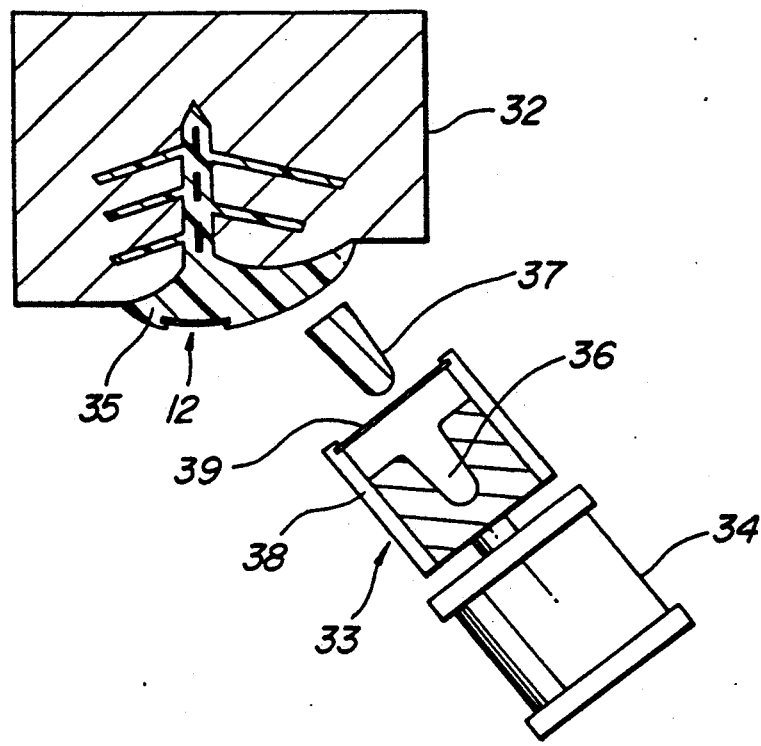
FIGS. 10a and 10b are cross-sectional views taken along the lines G—G and H—H in FIG. 7, respectively.
Figure 10B:
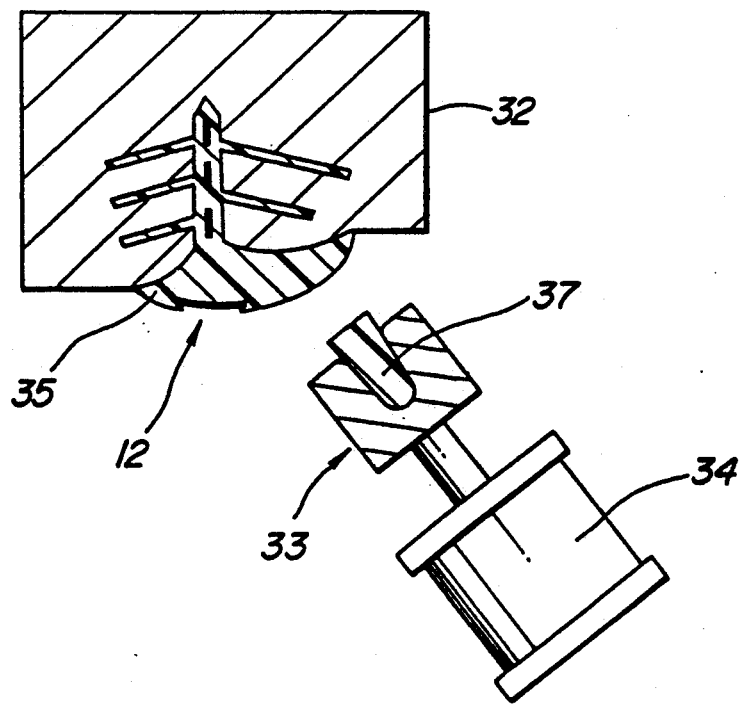
Figure 11:
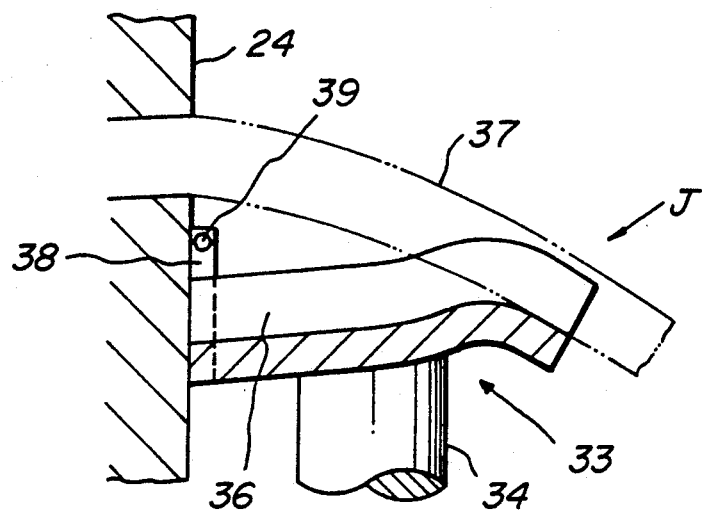
FIG. 11 is a side view, in an enlarged scale, of the movable guide member corresponding to the region I in FIG. 7.
Figure 12:
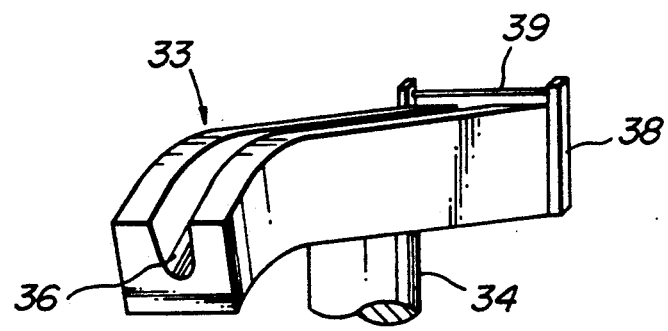
FIG. 12 is a perspective view of the movable guide member as seen in the direction of arrow J in FIG. 11.

After completion of the production schedule for a predetermined amount of the side segments 8, a second step is carried out to manufacture the upper segments 7 which include only the common cross-sectional portion 14. To this end, as shown in FIG. 7 and FIGS. 10a and 10b, the actuator 34 is retracted to move the movable guide member 33 away from the stationary guide member 32. On this occasion, the cutter blade 39 on the movable guide member 33 is moved across the synthetic resin material 37, which has already been extruded from the additional orifice 31, to cut it away. As shown in FIG. 11, a newly extruded synthetic resin material 37 is guided along the groove 36 in the guide member 33, kept spaced from the synthetic resin material 35 for the common cross-sectional portion 14, and is received by the collector 42 after a downward movement by the gravity. The synthetic resin material 35 extruded from the common orifice 30 forms a continuous body 52 with the common cross-section which, like the continuous body 44, is transferred to successive work stations and cut into a predetermined length of the upper segment 7.

With the above-mentioned method according to the present invention, it is possible to manufacture a plurality of kinds of extruded elongate articles with basically same and slightly different cross-sections, by using a single extrusion die plate 24 formed with the common orifice 30 and the additional orifice 31. The method can be carried out continuously and economically, with an improved productivity, without requiring exchange of die plate as well as a test-running extrusion to be performed after the exchange of the die plate.

In the above mentioned example of the method according to the present invention, the initial test-running extrusion was carried out with respect to the continuous body 52 corresponding to the upper segments 7 with the common cross-sectional portion 14 only. However, the test-running extrusion may be carried out with respect to the continuous body 44 which corresponds to the side segments 8 with the common cross-sectional portion 14 and the additional cross-sectional portion 15. Furthermore, the upper segments 7 and side segments 8 may be produced in the first and second steps, respectively, instead of producing the side segments 8 in the first step and the upper segments 7 in the second step as in the above-mentioned example.

Figure 13:
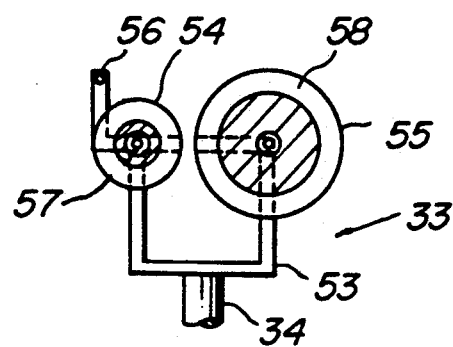
FIG. 13 is a side view of another embodiment of the movable guide member.

FIG. 13 shows another embodiment of the movable guide member 33 which is arranged adjacent to the extrusion die plate 24, and in opposition to the stationary guide member 32, for guiding the synthetic resin material 37 corresponding to the additional cross-sectional portion 15 of the side segment 8. The guide member 33 of this embodiment includes a frame 53 connected to the actuator 34, which supports a pair of rotatable guide rollers 54, 55 and a cutting blade 56 in the form of a metal wire. The guide rollers 54, 55 are provided, on their respective outer peripheral surfaces, with circumferential guide grooves 57, 58 and jointly serve to guide the extruded synthetic resin material 37 in their common tangential direction.

Another example of the upper and side segments of a windshield molding member, which can be manufactured by the present invention, is shown in FIGS. 14 and 15, respectively. The upper segment 7 is composed of a profiled main body 7a prepared by subjecting a metal strip to a roll forming operation, as well as a lip section 7b of an extruded synthetic resin material, which is to be brought into contact with the outer surface of a windshield plate 2, and which forms the common cross-sectional portion 14. A clip 17 is secured to the main body 7a, and is adapted to be engaged with a retainer 18 on the vehicle body panel 10 to retain the segment 7 in place. The side segment 8 also includes the common cross-sectional portion 14, and differs from the upper segment 7 in that it is provided with an additional cross-sectional portion 15 in the form of a ridge on the lip section 7b.

The method according to the present invention can also be applied to manufacture automobile side molding members 6 as shown in FIGS. 16 and 17. The side molding member 6 in FIG. 16 includes a main body 6a with a core strip 13 embedded therein, forming a common cross-sectional portion 14. On the other hand, the side molding member 6 in FIG. 17 includes, beside the common cross-sectional portion 14, an additional cross-sectional portion 15 formed of a plurality of longitudinally extending ornamental ridges. The two kinds of the side molding members 6 can be selectively used, for example according to the user's option or to the grade of the automobile.

Depending upon the product to be manufactured, it may be desirable to form the common cross-sectional portion and the additional cross-sectional portion with mutually different color, transparency and/or hardness. For example, it may be desirable for the ridge 15 of the side segments to have a hardness which is higher than that of the main body 7a in order to prevent deformation of the ridge 15.

Figure 18:
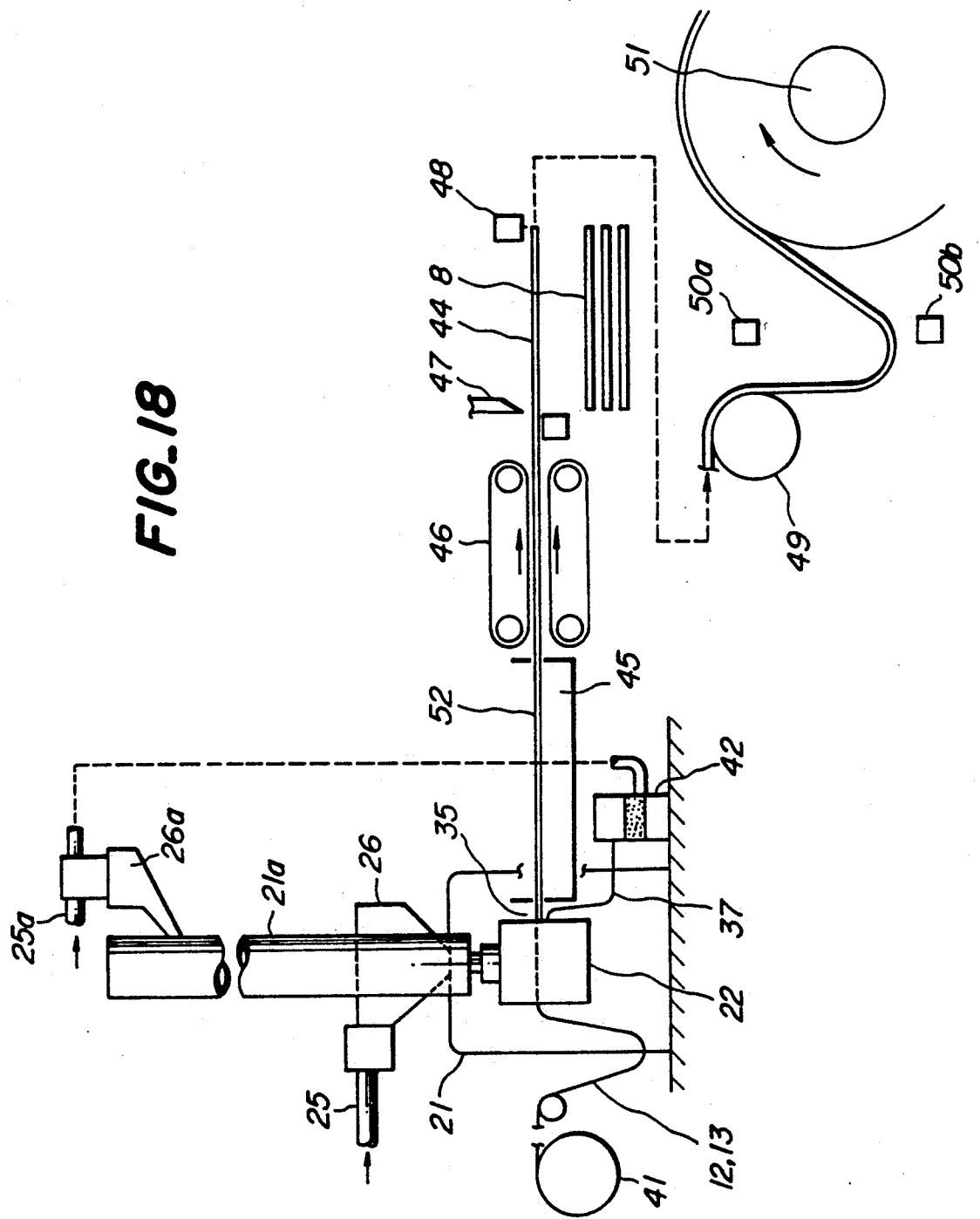
FIG. 18 is a schematic diagram of another embodiment of the production line which can be used to carry out the method according to the present invention, and which includes two extruders for the common cross-sectional portion and the additional cross-sectional portion.

FIG. 18 shows another embodiment of the production line which is substantially similar to that shown in FIG. 5, but which differs therefrom in that two extruder 21, 21a are associated with the extrusion die head 22. Hence, the production line of this embodiment can be used to manufacture upper and side segments 7, 8 of a windshield molding member 5, by extruding one or more kinds of synthetic resin materials into continuous bodies 44, 52 corresponding, respectively, to the common cross-sectional portion 14 and the additional cross-sectional portion 15 which are different in color, transparency and/or hardness from each other.

In this embodiment, the first extruder 21 is connected with the common orifice 30 in the die plate 24 through a passage 28, while the second extruder 21a is connected with the additional orifice 31 through a passage 29. The second extruder 21a has a hopper 26a which is connected to the collector 42 through the return pipe 46, and which is supplied with a synthetic resin material from its material supply pipe 25a.

Figure 19:
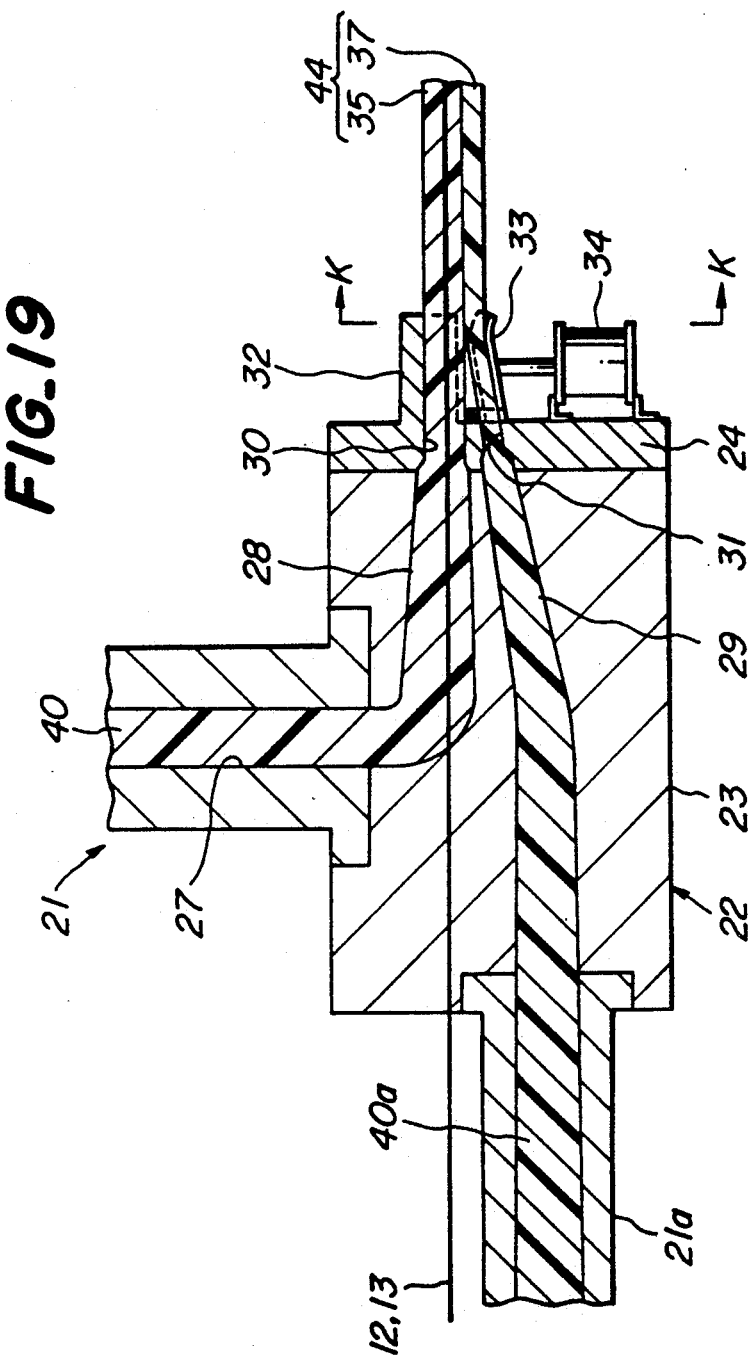
FIG. 19 is a longitudinal sectional view of the extrusion die head in the production line of FIG. 18, with the movable guide member assuming an operative position causing the extruded continuous bodies to adhere with each other.
Figure 20:
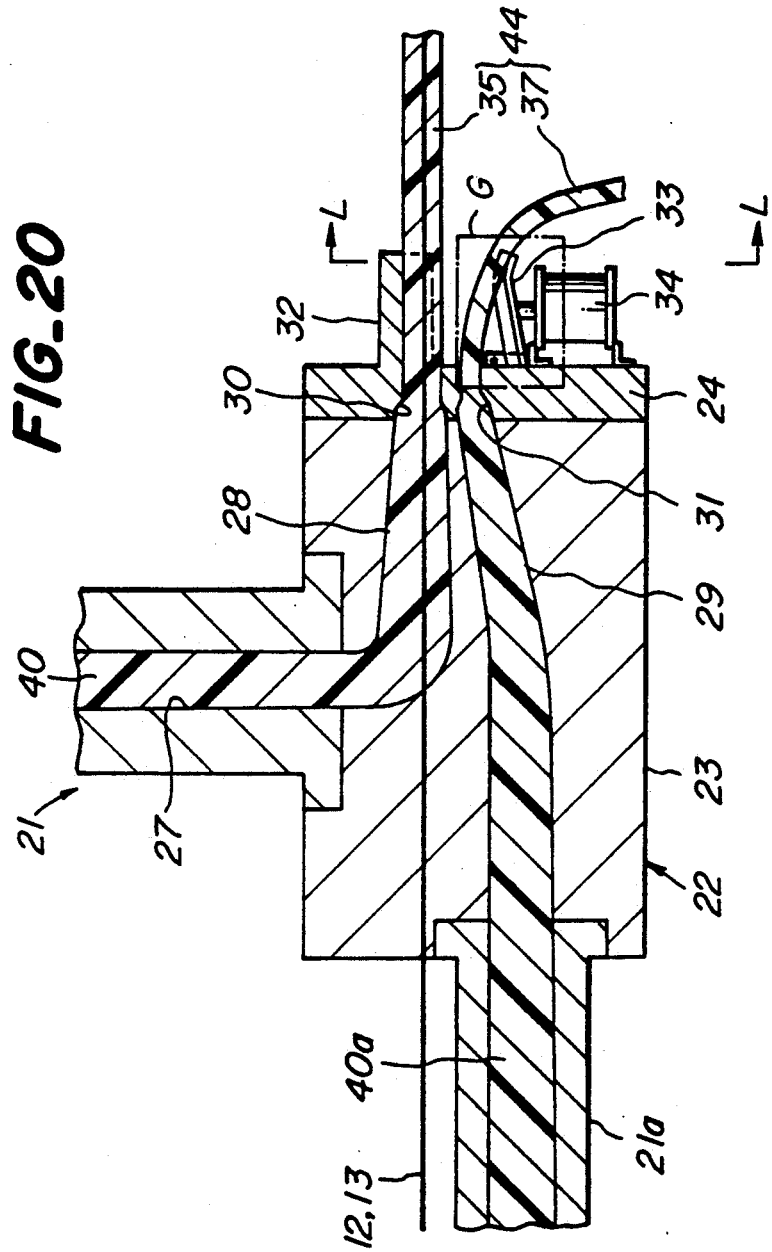
FIG. 20 is a longitudinal sectional view of the extrusion die head in the production line of FIG. 18, with the movable guide member assuming an inoperative position maintaining the extruded continuous bodies spaced from each other.

With the production line shown in FIG. 18, the side segments 8 and upper segments 7 of a windshield molding member 5 can be manufactured in first and second steps, respectively, substantially in the manner described above with reference to FIG. 5. The first step is shown in FIG. 19, and the second step is shown in FIG. 20. The first extruder 21, which serves to extrude the synthetic resin material 35 into the common cross-sectional portion 14, is maintained operative during the first and second steps. The second extruder 21a may be maintained inoperative during the second step, or during the formation of the upper segments 7 which correspond to the continuous body 52 without the additional cross-sectional portion 15. In this case, the additional orifice 31 in the die plate 24 need not be arranged below the common orifice 30; it may thus be arranged above or on one side of the common orifice 30. Alternatively, when the first step is to be carried out once again, immediately after the second step, the second extruder 21a may be maintained operative during the second step.

The production line shown in FIG. 1 features the provision of two extruders 21, 21a. The synthetic resin material to be supplied to the first extruder 21 may thus be different from the synthetic resin material to be supplied to the second extruder 21a, to realize the common cross-sectional portion 14 and the additional cross-sectional portion 15 which are different from each other in color, transparency and/or hardness. In this case, the two kinds of the synthetic resin materials should have an excellent cross-solubility or compatibility. The common cross sectional portion 14 and the additional cross-sectional portion 15 with mutually different color, transparency and/or hardness can be realized even when using a single kind of synthetic resin material, by an addition of different pigments to the synthetic resin material, and/or by an appropriate adjustment of the heating temperature or the like process conditions.

The production lines shown in FIGS. 5 and 18 may be modified so that it can be used to manufacture more than two kinds of cross-sections of the molding members or segments therefor. More particularly, as shown in FIGS. 21 to 26, the common cross-sectional portion 14 may have an ornamental film 12 which is completely embedded in the main body 7a and which can be optionally exposed outside by removing part of the surface material 12a of the main body 7a. By selectively removing the surface material 12a of the main body 7a in the upper and side segments 7 and 8, it is possible to efficiently and economically manufacture four kinds of basically same and slightly different cross-sections with only one die plate. To this end, a trimming device 60 may be arranged adjacent to the die plate 24 and also to the movable guide member 33. The trimming device 60 includes a pair of rotatable trimming blades 61, and an actuator 62 which is adapted to move the trimming blades 61 toward and away from the continuous body 35 corresponding to the common cross-sectional portion 14. The actuator 62 may be composed of a hydraulic or pneumatic cylinder device with a piston rod which is connected to the common rotational shaft of the trimming blades 61.

With the production line modified as above, the method according to the present invention may be carried out in the following four steps.

Figure 21:
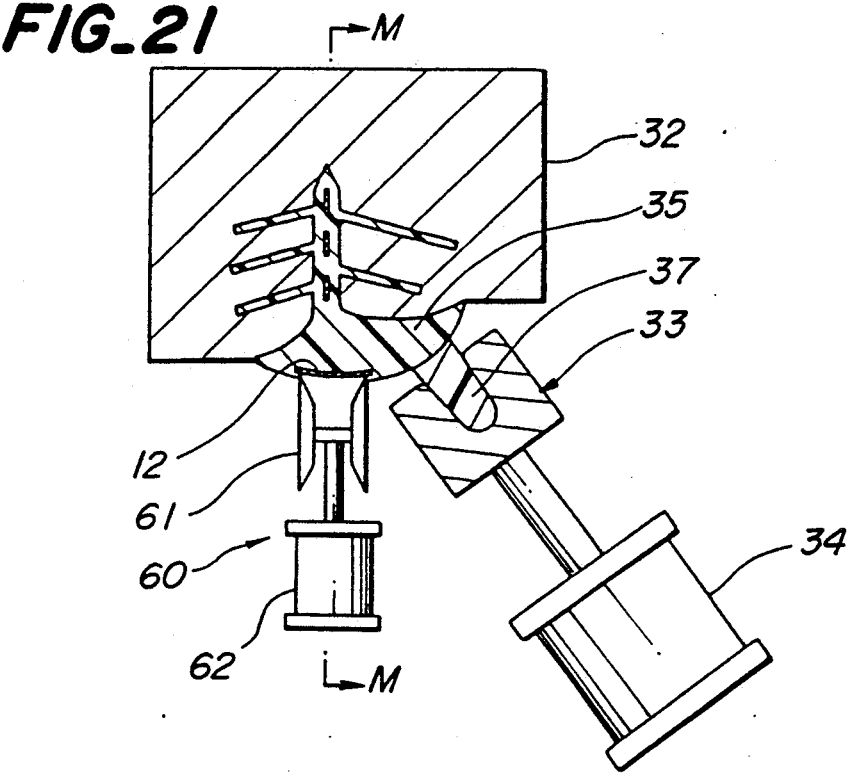
FIGS. 21 and 22 are cross-sectional views both taken along the line K—K in FIG. 19.
Figure 25:
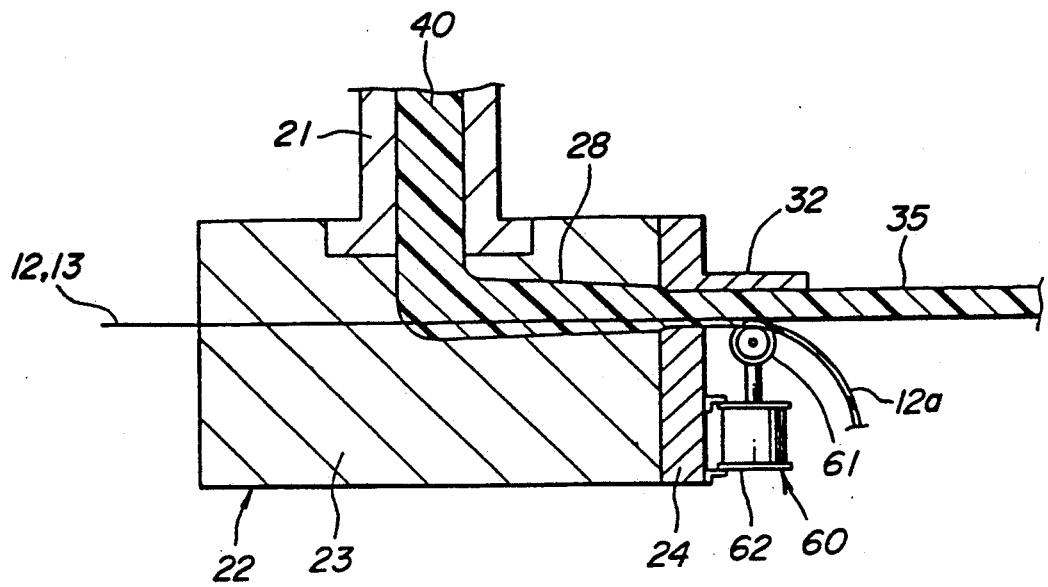
FIG. 25 is a longitudinal-sectional view taken along the line M—M in FIGS. 21 and 23.

In the first step, as shown in FIGS. 21 and 25, the continuous bodies 35, 37 corresponding to the common cross-sectional portion 14 and the additional cross-sectional portion 15 extruded from the die plate 24 are caused to adhere with each other substantially in the manner described with reference to the previous embodiments, to manufacture side segments 8 of a windshield molding member 5. The continuous body 35 as extruded has an ornamental film 12 completely embedded in the main body 7a. The ornamental film 12 is preferably composed of a transparent fluoride resin film layer with a poor tendency of adhesion to the surface material 12a to be removed, or an excellent separability from the surface material 12a, a suitably colored resin sheet or a metal deposition layer for the ornamental purpose, and a resin sheet with an excellent compatibility with the synthetic resin material of the main body 7a, which are laminated with each other in the stated sequence from the outer surface side. The trimming blades 61 are maintained in the operative position in contact with the above-mentioned fluoride resin film to effect trimming of the surface material 12a of the main body 5a and expose the ornamental film 12. By this, side segments 8 are manufactured with the surface material 12a of the main body removed and the ornamental film 12 exposed.

Figure 22:
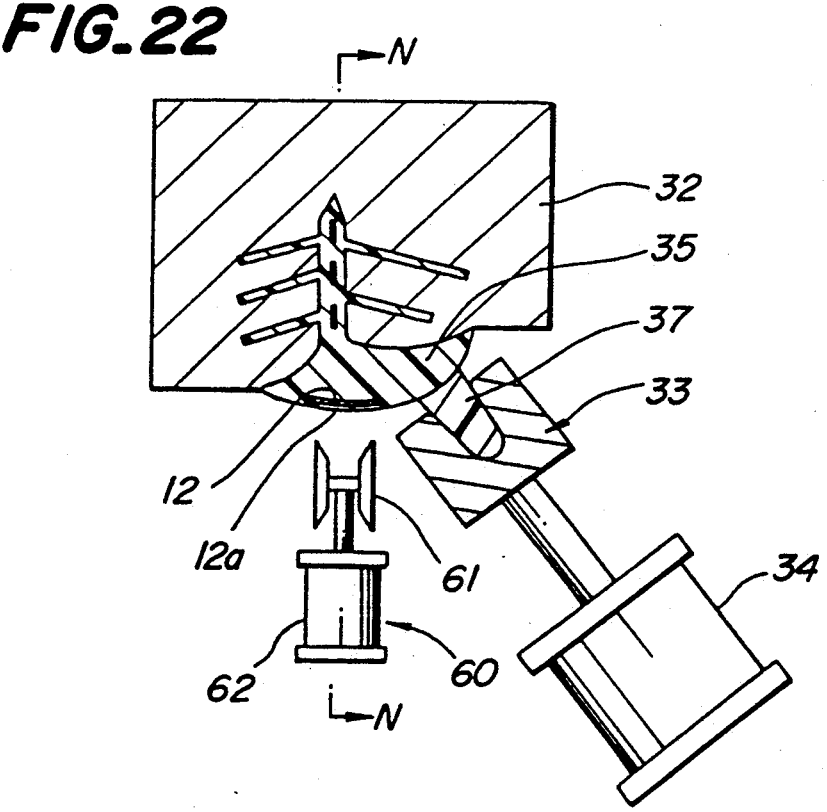
Figure 26:
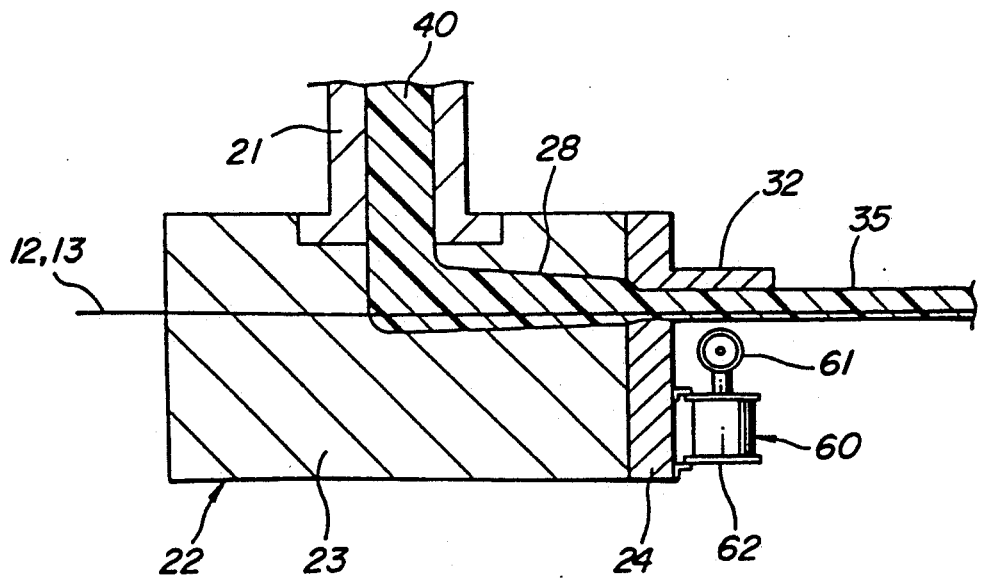
FIG. 26 is a longitudinal-sectional view taken along the line N—N in FIGS. 22 and 24.

In the second step, as shown in FIGS. 22 and 26, the actuator 62 of the trimming device 60 is operated to retract its piston rod and disengage the trimming blades 61 from the continuous body 35 to stop the trimming of the surface material 12a of the main body 7a. Thus, during the second step, side segments 8 are manufactured with the surface material 12a of the main body covering the ornamental film 12.

Figure 23:
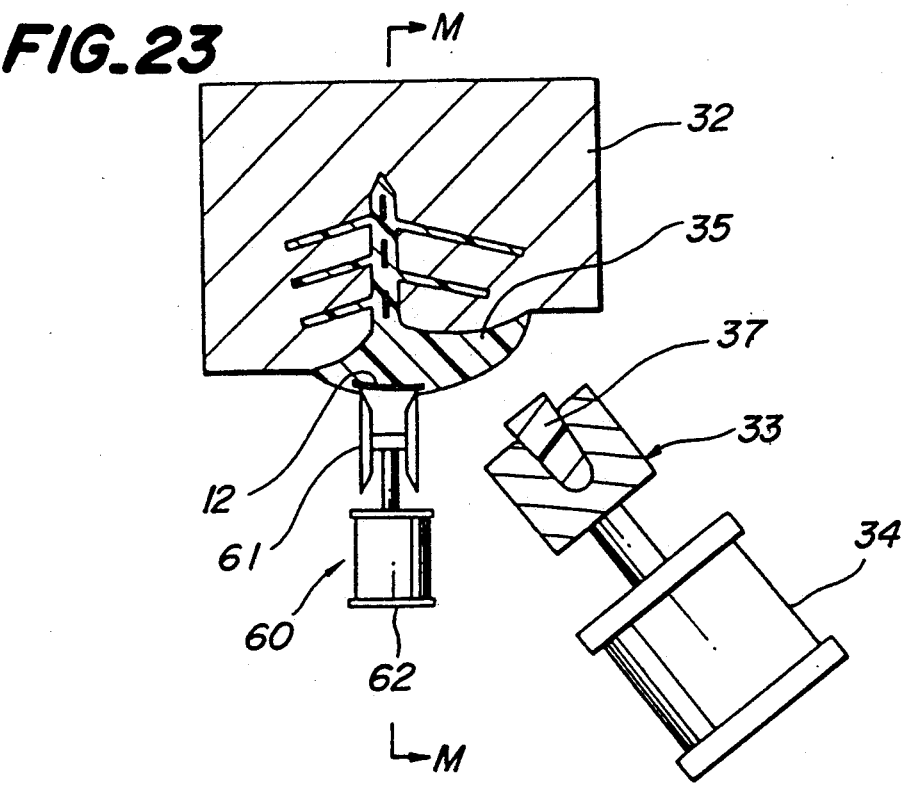
FIGS. 23 and 24 are cross-sectional views both taken along the line L—L in FIG. 20.

In the third step, as shown in FIGS. 23 and 25, the actuator 34 of the movable guide member 33 is operated to move the guide member 33 away from the stationary guide member 32. Thus, upper segments 7 are formed in the manner described with reference to the previous embodiments. In this step, the trimming blades 61 are maintained in the operative position to effect trimming of the surface material 12a of the main body 5a and expose the ornamental film 12. By this, upper segments 8 are manufactured with the surface material 12a of the main body removed and the ornamental film 12 exposed.

Figure 24:
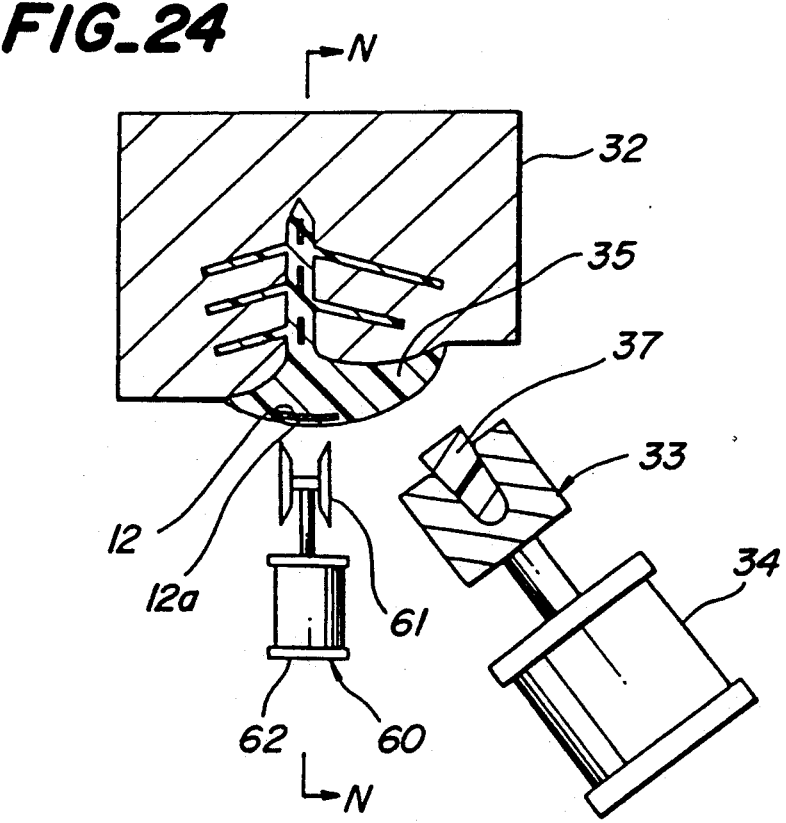

In the fourth step, as shown in FIGS. 24 and 26, the actuator 62 of the trimming device 60 is operated to retract its piston rod and disengage the trimming blades 61 from the continuous body 35 to stop the trimming of the surface material of the main body 7a. Thus, during the fourth step, upper segments 8 are manufactured with the surface material 12a of the main body covering the ornamental film 12.

It has to be noted that the supply of the ornamental film 12 is not necessary during the second and fourth steps, and the ornamental film 12 may be replaced by a less expensive core resin film which is the same in configuration as that of the ornamental film 12, and which is composed of a material exhibiting an excellent compatibility with the synthetic resin material of the main body 7a. Use of such a core resin film during the second and fourth steps serves to substantially reduce the production cost and, at the same time, to preserve a required shape stability of the continuous body 35.

It will be appreciated from the foregoing description that, in accordance with the present invention, it is possible to manufacture a plurality of kinds of elongate articles with basically same and slightly different cross-sections, by using a single extrusion die plate with a common orifice and at least one additional orifice. The present invention allows a plurality of kinds of elongate articles to be manufactured continuously and economically, without requiring exchange of the die plates as well as a resultant test-running extrusion after each exchange of the die plate.

The present invention is not limited to the above-mentioned embodiments, and a number of variations or modifications can be made without departing from the scope of the invention. For example, the die plate may be formed with two or more additional orifices each associated with a movable guide member.

What is claimed is:

1. A method of manufacturing first and second elongate articles each including at least a first section comprising a common cross-section portion, said second elongate article further including a second section comprising at least one additional cross-sectional portion in addition to said common cross-sectional portion, said first and second elongate articles being extruded from a single extrusion die head, said single extrusion die head comprising a die plate with a common orifice and at least one additional orifice which are arranged close to each other, said common orifice comprising a first cross-sectional contour and corresponding to said common cross-sectional portion of said first and second elongate articles, said at least one additional orifice comprising a second cross-sectional contour and corresponding to said at least one additional cross-sectional portion of said second elongate article, said method comprising the steps of:

feeding a molten synthetic resin material to said common orifice of said die plate and to said at least one additional orifice of said die plate from a common source of said molten synthetic resin material;

extruding said molten synthetic resin material from said common orifice of said die plate to continuously form a first elongate article with said first section and without said second section; and extruding said molten synthetic resin material from said common orifice and also from said at least one additional orifice of said die plate, and selectively joining first and second sections to each other when both sections are in a molten state, to continuously form a second elongate article from said first and second sections.

2. The method as claimed in claim 1, further comprising the step of diverting said at least one additional cross-sectional portion away from said first section which is said common cross-sectional portion during formation of said first elongate article.

3. A method of manufacturing first and second elongate articles each including at least a first section comprising a common cross-section portion, said second elongate article further including a second section comprising at least one additional cross-sectional portion in addition to said common cross-sectional portion, said first and second elongate articles being extruded from a single extrusion die head, said single extrusion die head comprising a die plate with a common orifice and at least one additional orifice which are arranged close to each other, said common orifice comprising a first cross-sectional contour and corresponding to said common cross-sectional portion of said first and second elongate articles, said at least one additional orifice comprising a second cross-sectional contour and corresponding to said at least one additional cross-sectional portion of said second elongate article, said method comprising the steps of:

feeding a first molten synthetic resin material to said common orifice of said die plate, and extruding from said common orifice of said die plate said first molten synthetic resin material to continuously form a first elongate article with said first section and without said second section; and feeding said first molten synthetic resin material to said common orifice and a second molten synthetic resin material to said at least one additional orifice of said die plate, extruding from said common orifice and said at least one additional orifice said first and second molten synthetic resin materials to simultaneously form said first and second sections, and selectively joining said first and second sections to each other, when both sections are in a molten state, to continuously form said second elongate article with said first and second sections.

4. The method as claimed in claim 3, further comprising the step of stopping the feeding of said second molten synthetic resin material to said at least one additional orifice during formation of said first elongate article.

5. The method as claimed in claim 3, comprising the step of using a common extruder for feeding said first molten synthetic resin material to said common orifice of said die plate, and at least one additional extruder for feeding said second molten synthetic resin material to said at least one additional orifice of said die plate.

6. The method as claimed in claim 3, wherein said first synthetic resin material is different in color from said second synthetic resin material.

7. The method as claimed in claim 3, wherein said first synthetic resin material is different in transparency from said second synthetic resin material.

8. The method as claimed in claim 3, wherein said first synthetic resin material is different in hardness from said second synthetic resin material.

* * * * *